April 13, 1937.  R. E. CUSHING  2,077,310
PROCESS OF PURIFYING CHLORINE
Filed Feb. 1, 1936
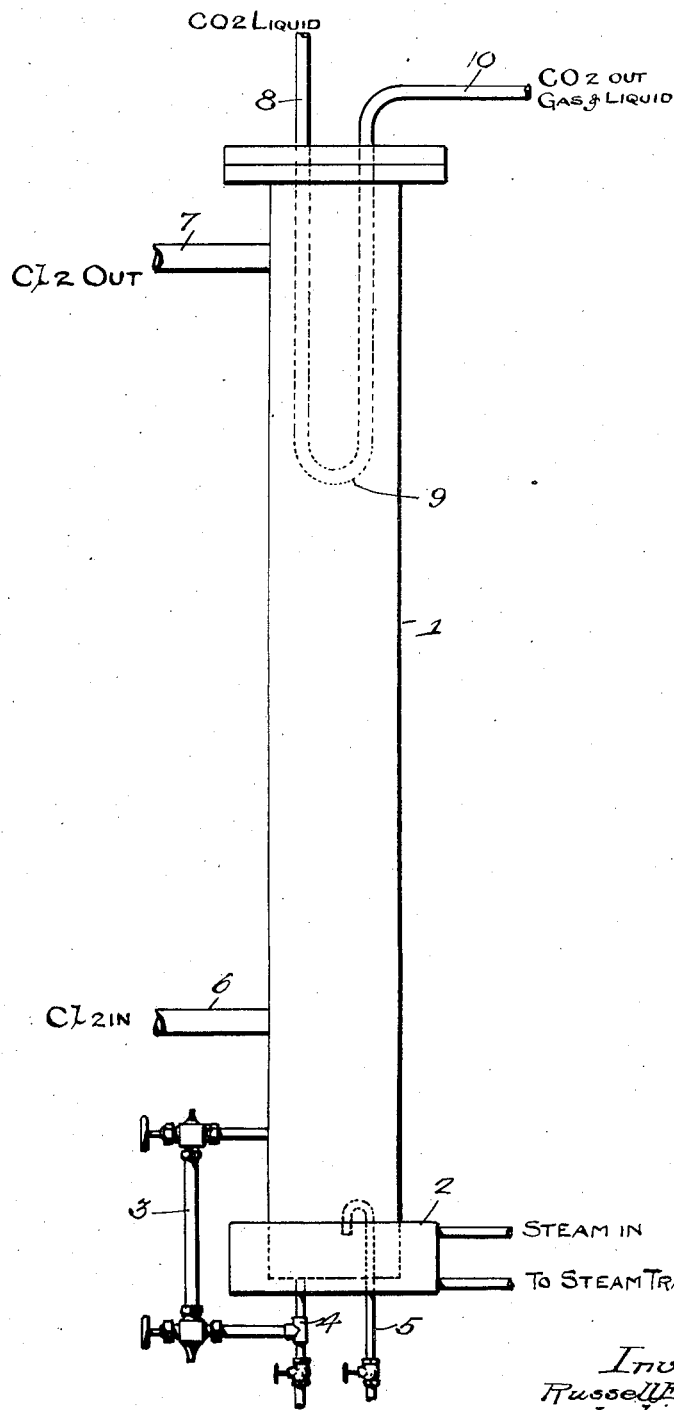
Inventor
Russell E. Cushing
by his Attorneys
Howson & Howson Patented Apr. 13, 1937

2,077,310

UNITED STATES PATENT OFFICE 2,077,310

PROCESS OF PURIFYING CHLORINE

Russell E. Cushing, Wyandotte, Mich., assignor to Pennsylvania Salt Manufacturing Company, Philadelphia, Pa., a corporation of Pennsylvania Application February 1, 1936, Serial No. 62,002

8 Claims. (Cl. 62—175.5)

My invention relates to a process of purifying chlorine, and more particularly it relates to a method of removing the organic impurities from chlorine.

Various methods have been suggested for the removal of hydrogen, air, and carbon dioxide from chlorine in the gaseous phase. The chlorine thus purified, however, contains organic impurities in relatively small amounts, generally less than 1%, by weight, and oftentimes only a fraction of this percentage. These organic impurities are probably formed in the electrolytic cell and pass out with the chlorine, and may include chloroform, carbon tetrachloride, acetylene tetrachloride, hexachlorethane, and hexachlorbenzene. Even with liquid chlorine containing over 99.9% of chlorine, by weight, which is one of the purest commercial materials available, considerable difficulty, due to the organic impurities, is encountered in connection with the clogging of valves or instruments through which the gas passes after having been vaporized. Furthermore, in those processes which employ chlorine that is evaporated from a cylinder or other container, the organic materials, which have a much higher boiling point than chlorine, accumulate and are oftentimes present in considerable quantities when the container is nearly empty, thus chlorine lacking in uniform purity is furnished.

The principal object of the present invention is to provide an economical process of removing the minute quantities of organic impurities from chlorine, with the result that no clogging of the valves and the like occurs and a chlorine gas is provided which may be vaporized from a suitable container with assurance that the purity of the chlorine will be uniform throughout its delivery therefrom.

A further object is to provide a method of obtaining chlorine free from organic contaminants which may be operated continuously and in which there is no loss of chlorine and no dilution thereof by other gases or substances.

Other objects will be apparent from a consideration of this specification and claims.

The process of the present invention contemplates treating the gas to be purified with liquid chlorine, in which it has been found the organic impurities may be condensed and are soluble, to remove the impurities therefrom. Subsequently, if desired, the liquid chlorine may be separated from the organic impurities. The liquid chlorine employed in the process may be furnished from any source, for example the chlorine may be liquefied in a condenser or other device outside of and apart from the apparatus in which the gas is treated and delivered to apparatus by suitable pipe lines and discharged into the top thereof. Preferably, however, the liquid chlorine is obtained by liquefying a portion of the gas to be purified, and this may be easily accomplished by passing the chlorine gas upwards through a column or tower which is provided near the top thereof with a refrigerating coil maintained at a sufficiently low temperature to lower the temperature of a portion of the chlorine gas to the dew-point at the existing pressure. The various factors, such as the temperatures of the gas and coil, the pressure of the gas, the quantity of gas contacting the coil and the rate of flow of the gas, can be adjusted in any particular instance so that the desired amount of chlorine is liquefied.

The liquid chlorine falling down through the apparatus contacts the gas flowing in the opposite direction, and chlorine gas free from organic impurities is obtained. Preferably, the apparatus employed is one which will provide intimate contact between the chlorine gas and the liquid chlorine. While many types of devices may be employed to treat the gas with the liquid chlorine, a fractionating column of the well known bubble cap type may advantageously be used, since the contact between the gas and liquid caused by the bubble caps mounted on the series of plates is especially efficient.

The boiling points of the organic impurities which vary from 61° C. to 250° C. or above are very much higher than that of the liquid chlorine, and the separation of the organic impurities from the gas is brought about by the liquid chlorine by a fractionation process. When the gas to be purified comes in contact with the very cold liquid chlorine, the temperature becomes sufficiently low so that a portion of the organic impurities condenses with the liberation of a small amount of heat. The tendency of this liberated heat and the heat of the incoming gases to elevate the temperature of the mixture of chlorine and condensed impurities is overcome by having sufficient liquid chlorine present and by the evaporation of a portion of the liquid chlorine present. The chlorine evaporating in the process is not pure, but carries with it a certain small portion of organic impurities so that the composition of the vapor leaving the body of liquid is in equilibrium with that liquid according to well-known laws of partial pressure. The vapor, however, contains a somewhat smaller percentage of organic impurities than that which entered the column. This process is repeated within the column many times as the gas passes upward, regardless of the construction of the column, until the gas is freed, for all practical purposes, of the organic impurities. Thus the liquid chlorine flows downward through the column becoming more and more highly contaminated with organic impurities until there exists a point near the bottom in which the impurities make up the greater proportion of the liquid. The temperature at the bottom of the column determines whether there is collected there a mixture of liquid chlorine (for example 10% to 15% by weight of chlorine) containing organic impurities dissolved or suspended in it or a liquid of organic material containing suspended organic solids which are present in excess of their solubility in the amount of liquid organic impurities removed, the chlorine content being very small (1% or less, by weight). In the operation of the process, it is generally preferably to maintain the conditions in the column so that the liquid impurities collected at the bottom of the column contain only a minimum of chlorine, thus avoiding a loss of this material. From the above description, it is clear that the purifying process involves condensation and solution of the organic impurities by the liquid chlorine, although the impurities collected may be practically free from chlorine, and that the column or other purifying apparatus operates as a fractionating column.

It will be seen that a continuous purification process may be carried out by passing the chlorine into the column continuously, furnishing the required amount of liquid chlorine thereto, for example by maintaining the refrigerating coil at the proper temperature to liquefy the desired amount of the gas, maintaining the conditions in the column correctly so that the fractionating process purifies the gas, and removing the impurities from the bottom of the column.

The chlorine gas treated is preferably free from sulphuric acid and like impurities and may or may not contain gaseous diluents such as hydrogen, carbon dioxide, and air. If the gas from which the organic impurities have been removed by the process of the invention contains an undesirable amount of gaseous diluents, it may be subjected to the usual liquefaction process to remove these materials and thus to obtain liquid chlorine of a purity of substantially 100%.

The accompanying drawing illustrates diagrammatically the process. In the drawing, a suitable column is shown at 1 and it is to be understood that this is furnished with suitable well known means for insuring intimate contact between the gas and liquid. The column is provided at its bottom with heating means 2 such as a steam jacket. A gauge glass 3 and draining pipes 4 and 5 are also illustrated, the drain 5 being normally employed since the pressure of the system forces the impurities through the pipe 5, although when complete draining of the system is desired pipe 4 may be opened. The inlet pipe for the chlorine gas to be purified is represented at 6, as is the outlet pipe for the purified gas at 7. The refrigerating system, including the coil in the form of a nest of pipes in which carbon dioxide may advantageously be evaporated, is shown at 8, 9 and 10. While in the drawing, the gas outlet is shown at a point above the refrigerating coil, a device in which the gas outlet is below the coil, so that only a portion of the gas passing through the column reaches the coil, operates very satisfactorily.

In the operation of the column, chlorine gas, preferably dry, enters the column or tower 1 at 6 at a suitable pressure and temperature. As the gas passes upwardly through the column, it contacts the cold surface of the coil 9, and a portion of the gas is liquefied. The coil is maintained at a temperature depending upon other conditions to reduce a portion of the gas to the dew point at the existing pressure. The liquid chlorine falls down through the tower and effectively purifies the ascending gas and removes the organic impurities, carrying them to the bottom of the column as previously described. The heat supplied by the steam jacket 2 of the column determines the amount of chlorine associated with the impurities collected at the bottom of the column, since it controls the amount of liquid chlorine evaporated. While at the same time, a portion of the organic impurities is also evaporated depending upon their nature, the temperature and partial pressure existing, this is condensed by the action described before the vapors of the impurities have risen very far in the column. The chlorine evaporated from the liquid impurities joins the chlorine entering at 6 and finally after being purified by the fractionating action, passes out of the system at 7. The organic impurities together with any solids which may be in suspension are drawn off by the drain 5, either continuously or intermittently, the level of the impurities in the column being ascertained by means of gauge glass 3.

In a preferred example, in a column about 15¼ inches in diameter and 24 feet high, the chlorine gas is admitted at a temperature in the neighborhood of 25° C. to 30° C. and at a pressure of 25 to 30 pounds per square inch, at the rate of 66,000 pounds of chlorine per 24 hours. The temperature of the coil (−13° C.) is such that about 15%, by weight of the total chlorine is liquefied, although the liquefaction of a larger or smaller portion of the chlorine will function satisfactorily, and the temperature of the purified gas leaving the column is about −8° C. The pressure of the exit gas is in the neighborhood of 25 to 30 pounds per square inch. During a period of twenty-four hours, about 50 pounds of impurities (depending on the amount thereof in the entering gas) containing less than 1% by weight, of chlorine are removed from the column, when the temperature at the bottom of the column causes vaporization of the liquid chlorine. In general depending on the other operating conditions, the temperature of the impurities as they are removed from the bottom of the column is of the order of 100° F. when the process is operated a separation of the gaseous and liquid chlorine, to obtain impurities substantially free from chlorine. Obviously, if the impurities are removed at a lower temperature, a mixture of the impurities and a small amount of chlorine is obtained. The liquefaction of about 15%, by weight, of the chlorine is sufficient to purify itself and the other 85%, by weight, of the chlorine passing through the tower. By the process, a gas containing 99.999%, by weight, chlorine may be obtained, even though the so-called impure gas contained 99.9% or more, by weight, chlorine. Corresponding freedom from organic impurities may be obtained when a chlorine gas containing appreciable amounts of other gases, such as hydrogen, oxygen, and carbon dioxide, is treated. It will be noted that substantially no chlorine is lost in the process and that no diluted gas is formed or added in the process.

Considerable modification is possible in the temperatures and pressures employed and in the amount of chlorine liquefied as well as in the type of equipment utilized without departing from the essential features of the invention.

I claim:

1. The process of removing the organic impurities from chlorine in mixtures of chlorine containing less than about 1%, by weight, of such impurities, which comprises passing the chlorine to be purified in the gaseous phase into a suitable container, converting a portion of said gaseous chlorine into liquid chlorine, bringing said gaseous chlorine and said liquid chlorine into contact to cause condensation and solution of the impurities of the gaseous chlorine by the liquid chlorine, and thereafter effecting a separation of the gaseous chlorine and the materials in the liquid phase.

2. The process of removing the organic impurities from chlorine in mixtures of chlorine containing less than about 1%, by weight, of such impurities, which comprises passing the chlorine to be purified in the gaseous phase upwardly through a suitable container, converting a portion of said gaseous chlorine into liquid chlorine in said container at a point above the gas inlet, causing intimate contact between the liquid chlorine passing downwardly in said container with the gaseous chlorine flowing countercurrently thereto to cause condensation and solution of the impurities of the gaseous chlorine by the liquid chlorine, and removing the purified gaseous chlorine from the container at a point adjacent the top thereof.

3. The process of removing the organic impurities from chlorine in mixtures of chlorine containing less than about 1%, by weight, of such impurities, which comprises passing the chlorine to be purified in the gaseous phase upwardly through a suitable container, converting a portion of said gaseous chlorine into liquid chlorine in said container at a point above the gas inlet, causing intimate contact between the liquid chlorine passing downwardly in said container with the gaseous chlorine flowing countercurrently thereto to cause condensation and solution of the impurities of the gaseous chlorine by the liquid chlorine, removing the purified gaseous chlorine from the container at a point adjacent the top thereof, and removing the liquid material from the container at a point adjacent the bottom thereof.

4. The process of removing the organic impurities from chlorine in mixtures of chlorine containing less than about 1%, by weight, of such impurities, which comprises passing the chlorine to be purified in the gaseous phase upwardly through a suitable container, converting a portion of said gaseous chlorine into liquid chlorine in said container at a point above the gas inlet, causing intimate contact between the liquid chlorine passing downwardly in said container with the gaseous chlorine flowing countercurrently thereto to cause condensation and solution of the impurities of the gaseous chlorine by the liquid chlorine, removing the purified gaseous chlorine from the container at a point adjacent the top thereof, maintaining the container at a point adjacent the bottom thereof at a temperature sufficient to free substantially the organic impurities from chlorine, and removing the organic impurities from the container at a point adjacent the bottom thereof.

5. The process of removing the organic impurities from chlorine in mixtures of chlorine containing less than about 1%, by weight, of such impurities, which comprises bringing chlorine to be purified in the gaseous phase into contact with liquid chlorine to cause condensation and solution of the organic impurities of the gaseous chlorine by the liquid chlorine, effecting a separation of the gaseous and liquid chlorine, and maintaining suitable temperature conditions on the liquid materials to separate substantially the chlorine as a gas from the condensed organic impurities.

6. The process of removing the organic impurities from chlorine in mixtures of chlorine containing less than about 1%, by weight, of such impurities, which comprises passing chlorine to be purified in the gaseous phase upwardly through a suitable container, passing liquid chlorine downwardly through said chlorine, causing intimate contact between the liquid chlorine and the gaseous chlorine flowing countercurrently thereto, effecting a separation of the gaseous and liquid chlorine, and maintaining suitable temperature conditions on the liquid materials to separate substantially the chlorine as a gas from the condensed organic impurities.

7. The process of removing the organic impurities from chlorine in mixtures of chlorine containing less than about 1%, by weight, of such impurities, which comprises passing chlorine to be purified in the gaseous phase into a suitable container, converting a portion of said gaseous chlorine into liquid chlorine, bringing said gaseous chlorine and said liquid chlorine into contact to cause condensation and solution of the impurities of the gaseous chlorine by the liquid chlorine, effecting a separation of the gaseous and liquid chlorine, maintaining suitable temperature conditions on the liquid materials to separate substantially the chlorine as a gas from the condensed organic impurities, and mixing the vaporized chlorine with the gaseous chlorine entering the container.

8. The process of removing the organic impurities from chlorine in mixtures of chlorine containing less than about 1%, by weight, of such impurities, which comprises passing the chlorine to be purified in the gaseous phase upwardly through a suitable container, bringing said gas in contact with a refrigerating coil maintained at a temperature sufficiently low to convert a portion of said gas to a liquid, said coil being located in said container at a point above the gas inlet, causing intimate contact between the liquid chlorine passing downwardly in said container with the gaseous chlorine flowing countercurrently thereto to cause condensation and solution of the impurities of the gaseous chlorine by the liquid chlorine, removing the purified gaseous chlorine from the container at a point adjacent the top thereof, maintaining the container at a point adjacent the bottom thereof at a temperature sufficient to free substantially the organic impurities from chlorine, mixing the vaporized chlorine with the gaseous chlorine entering the container, and removing the organic impurities from the container at a point adjacent the bottom thereof.

RUSSELL E. CUSHING.

CERTIFICATE OF CORRECTION.

Patent No. 2,077,310.                                                                  April 13, 1937.

RUSSELL E. CUSHING.

It is hereby certified that error appears in the printed specification of the above numbered patent requiring correction as follows: Page 2, first column, line 21, for the word "preferably" read preferable; and second column, line 59, strike out the words and comma "a separation of the gaseous and liquid chlorine," and that the said Letters Patent should be read with these corrections therein that the same may conform to the record of the case in the Patent Office.

Signed and sealed this 3d day of May, A. D. 1938.

(Seal)                                                      Henry Van Arsdale,
Acting Commissioner of Patents.